(12) United States Patent
Yang

(10) Patent No.: US 7,447,003 B2
(45) Date of Patent: Nov. 4, 2008

(54) ELECTRONIC DEVICE WITH A MOVEABLE CASE

(75) Inventor: Shun-Yu Yang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 338 days.

(21) Appl. No.: 11/415,123

(22) Filed: May 2, 2006

(65) Prior Publication Data

US 2006/0255890 A1  Nov. 16, 2006

(30) Foreign Application Priority Data

May 11, 2005  (TW)  .............................. 94115260 A

(51) Int. Cl.
 *H05K 5/00* (2006.01)
(52) U.S. Cl. ...................................................... 361/679
(58) Field of Classification Search ................. 361/679, 361/690, 687, 683, 704, 680, 681, 692
See application file for complete search history.

(56) References Cited

U.S. PATENT DOCUMENTS 5,774,333 A * 6/1998 Janik et al. .................. 361/687
6,094,347 A * 7/2000 Bhatia ........................ 361/695

* cited by examiner

*Primary Examiner*—Javaid Nasri
(74) *Attorney, Agent, or Firm*—Muncy, Geissler, Olds & Lowe, PLLC

(57) ABSTRACT

An electronic device with a moveable case comprises an upper cover and a moveable base. The moveable base is a hollow shell, and one side wall of the moveable base is pivoted with one side of the upper cover for the moveable base to rotate around the pivot. Another side of the cover has a control structure for controlling the movement of the moveable base.

8 Claims, 4 Drawing Sheets

ELECTRONIC DEVICE WITH A MOVEABLE CASE

RELATED APPLICATIONS

The present application is based on, and claims priority from, Taiwan Application Serial Number 94115260, filed May 11, 2005, the disclosure of which is hereby incorporated by reference herein in its entirety.

BACKGROUND

1. Field of Invention

The present invention relates to an electronic device. More particularly, the present invention relates to an electronic device with a moveable case.

2. Description of Related Art

Many kinds of electronic devices like personal computers (PC), personal digital assistants (PDA), digital cameras and mobile phones are frequently used by people in modern times. Progress in design and manufacturing techniques, have made these electronic devices smaller and smaller and they are becoming more convenient to carry. For example, an original mainframe system occupied a very large footprint, but the desktops and laptops nowadays can be placed at the edge of a table and are very easy to carry.

However smaller sizes and easy portability have led to other problems. For example, a small volume means that the case surrounding the whole electronic device is small and the volume of the internal space of the case is also small.

FIG. 1 illustrates a conventional portable computer 100, which can be divided into two parts: a host which has a system circuit of the portable computer 100 and a screen which has a display panel. Therefore, a case of the portable computer 100 can also be divided into two parts: a host case 102 and a screen case 104. The host case 102 contains the system circuitry, and the screen case 104 contains the display panel of the portable computer 100.

To satisfy the portability requirements of portable computers, both the host case 102 and the screen case 104 generally have a flat shape, and the thickness of these cases is becoming increasingly thin.

In general, the screen case 104 contains a thin display panel, such as liquid crystal display (LCD) panel, and the only purpose of the display panel is to display images. Therefore, the conventional screen case 104 is suitable for portable computer applications.

The system circuitry of the portable computer 100 is able to output and input various kinds of data and carry out complicated operational processes in great quantity; hence the system circuitry needs to be connected to various data linking interfaces and usually produces much heat. The host case 102 contains the system circuitry in the portable computer 100; therefore, several data linking interfaces 106 and a radiating vent 108 should be disposed at a side of the host case 102, where the several data linking interfaces 106 can be used to connect with other electronic devices and the radiating vent 108 is used to vent the heat generated when the system circuitry is operating.

The development trend of electronic devices is that the volume of their cases is getting progressively smaller, the standards of data transmission are becoming more and more numerous, and the operational capability of the system circuitry is becoming more and more powerful and dispersing more and more heat. Consequently the design and manufacture of cases are becoming increasingly harder because more elements, such as data linking interfaces and radiating vents, must be contained in a smaller case. Therefore, a new case structure for electronic devices is needed to solve these potential problems.

SUMMARY

It is therefore an objective of the present invention to provide a moveable case used in an electronic device.

It is another objective of the present invention to provide an electronic device that is able to conform to ergonomic design.

According to the foregoing objectives of the invention, an electronic device case according to an embodiment of the present invention comprises two parts, an upper cover and a moveable base. The moveable base is a hollow shell, and one side wall of the moveable base is pivoted with one side of the upper cover allowing the moveable base to rotate around the pivot. Another side of the cover has a control structure for controlling the movement of the moveable base.

BRIEF DESCRIPTION OF THE DRAWINGS

These and other features, aspects, and advantages of the present invention will become better understood with regard to the following description, appended claims, and accompanying drawings, where:

DESCRIPTION OF THE PREFERRED EMBODIMENTS

Figure 1:
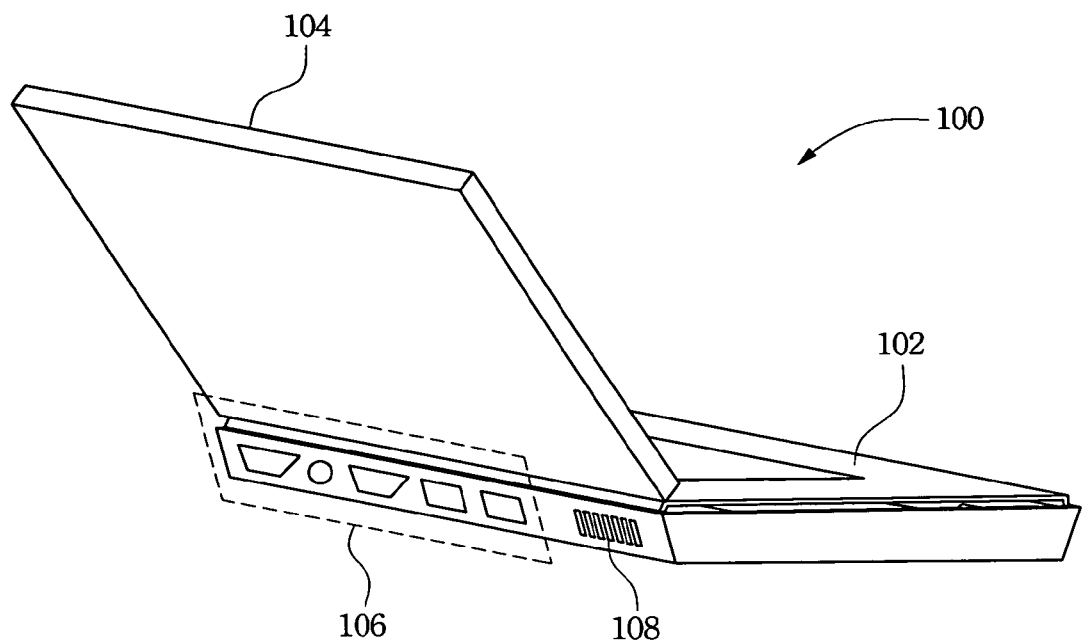
FIG. 1 is a structural drawing of a conventional portable computer.

Reference will now be made in detail to the present preferred embodiments of the invention, examples of which are illustrated in the accompanying drawings. Wherever possible, the same reference numbers are used in the drawings and the description to refer to the same or like parts.

The current trend in electronics is for devices that are light, thin, short and with small volume. Consequently, the capacity in the host case of electronic devices has to also become smaller. There is not only the main system circuitry of the electronic devices but also some data linking interfaces and extending modules that need to be contained within the host case; hence, the host case must have enough space to contain devices for external connectivity and vent thermal heat generated by system. The basic concept of the present invention is to design a moveable base for the host case. When extending or radiating space is desired in the electronic device, the moveable base can be opened to increase the space in the host case.

Figure 2:
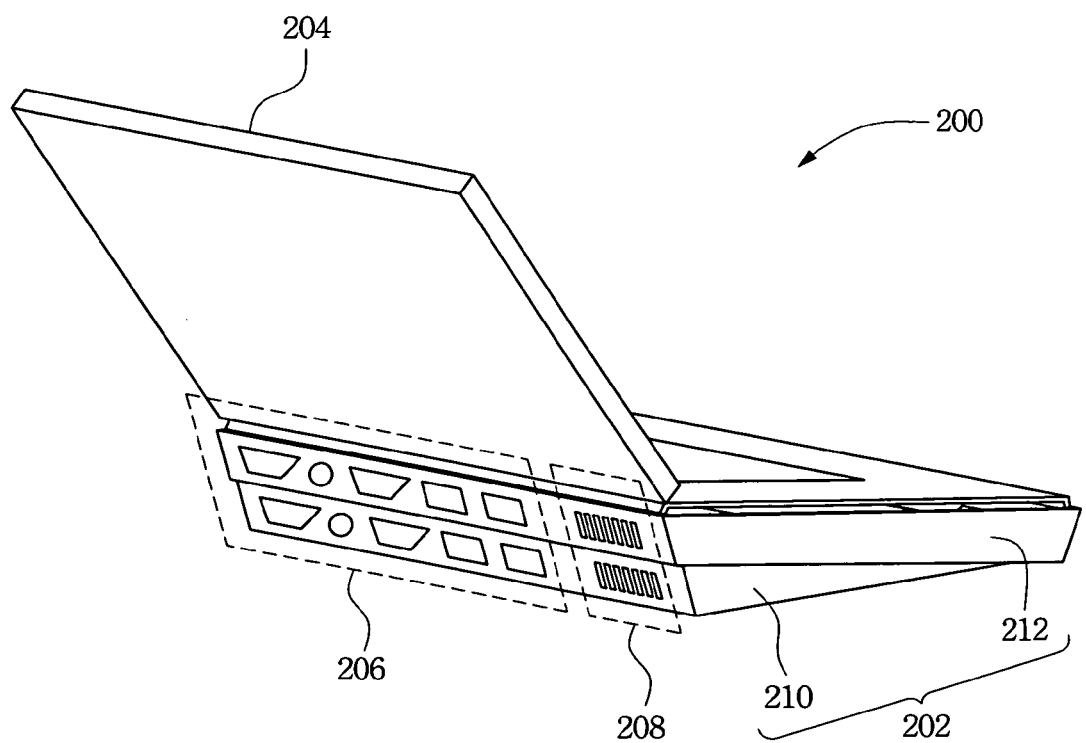
FIG. 2 is a structural drawing of a portable computer according to an embodiment of the present invention.

FIG. 2 illustrates a portable computer 200 according to an embodiment of the present invention, wherein the case of the portable computer 200 comprises a host case 202 and a screen case 204. It is understood, some other kinds of electronic devices may have only a single case, where both the system circuitry and the display panel are installed together in one host case. In such case, the electronic devices will be seen as only has a host case.

The difference between the portable computer 100 illustrated in FIG. 1 and the portable computer 200 illustrated in FIG. 2 is that the host case 202 of the portable computer 200 has a moveable base 210. The host case 202 can be further divided into two parts, an upper cover 212 and the moveable base 210, wherein the moveable base 210 extends from the upper cover 212. Thus, compared with the portable computer 100, the host case 202 of the portable computer 200 has a larger capacity for containing elements, such as more data linking interfaces 206 and more radiating vents 208.

In addition, when the moveable base 210 is opened from the upper cover 212, the rear of the portable computer 200 can be propped up relative to the user. This design is more comfortable for the user to operate the portable computer 200; that is, this design is more ergonomic. Finally, when the extending space of the moveable base 210 is not needed any more, the upper cover 212 of the moveable base 210 can be retracted for the convenience of transport.

Figure 3:
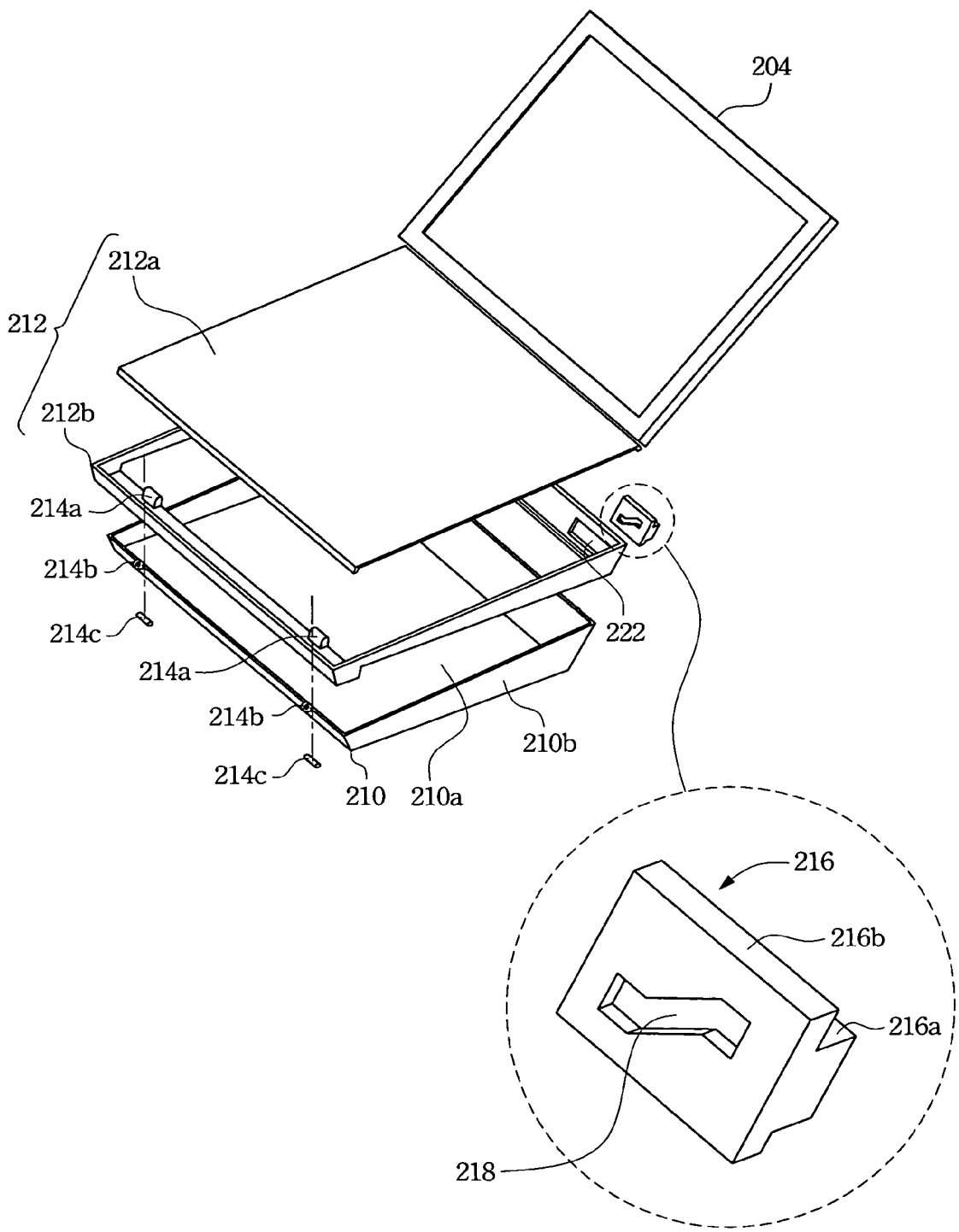
FIG. 3 is an exploded view of the structure of a portable computer according to an embodiment of the present invention.

An embodiment of the present invention used to implement the function discussed in the foregoing description is provided. FIG. 3 illustrates an exploded view of the portable computer 200 illustrated in FIG. 2. In this exploded view, for the clarity of explaining internal structure of the host case 202, the host case 202 will be divided into three parts: a top cover 212a, an upper cover side wall 212b and the moveable base 210, wherein the upper cover 212 illustrated in FIG. 2 is the top cover 212a combined with the upper cover side wall 212b.

Referring to FIG. 3, the moveable base 210 is a hollow shell comprising a bottom board 210a and a base side wall 210b, wherein the base side wall 210b surrounds the bottom board 210a. In this embodiment, both the upper cover side wall 212b and the base side wall 210b have at least one pivot structure, wherein the pivot structure of the upper cover side wall 212b can be pivoted on the pivot structure of the base side wall 210b. In this embodiment, the pivot structures are two first connection parts 214a, two second connection parts 214b and two hinges 214c, but the quantity of pivot structures in practice is not limited by the embodiment. The hinges 214c are used through the first connection parts 214a and the second connection parts 214b for connecting the moveable base 210 and the upper cover 212, and then the moveable base 210 can pivot using the hinges 214c. The hinges 214c may be pivot axles.

In practice, the moveable base 210 does not need a broad pivot motion, therefore a control structure must be designed on the upper cover 212 for appropriately controlling the movement of the moveable base 210. In this embodiment, the control structure is implemented with at least one slide button 216, but the amount of the slide buttons 216 is not limited by the embodiment. There is an opening 222 through one surface of the upper cover side wall 212b, and the slide button 216 is able to slide in the opening 222, wherein preferably the opening 222 and the slide button 216 can be placed on a different side of upper cover side wall 212b relative to the first connection parts 214a.

In this embodiment, the slide button 216 has two parts including an operation part 216a and a sliding part 216b. It can be seen in FIG. 3 that the operation part 216a and the sliding part 216b construct a T-shape structure. Therefore, the operation part 216a with a smaller area passes through the opening 222 so the user can push the slide button 216, and the sliding part 216b can closely nestle and slide along the edges of the opening 222. Furthermore, one surface of the sliding part 216b which faces the inner cavity of the upper cover side wall 212b has a track 218 with a fillister, and the shape of the track 218 is similar to a reverse Z-shape.

Figure 4:
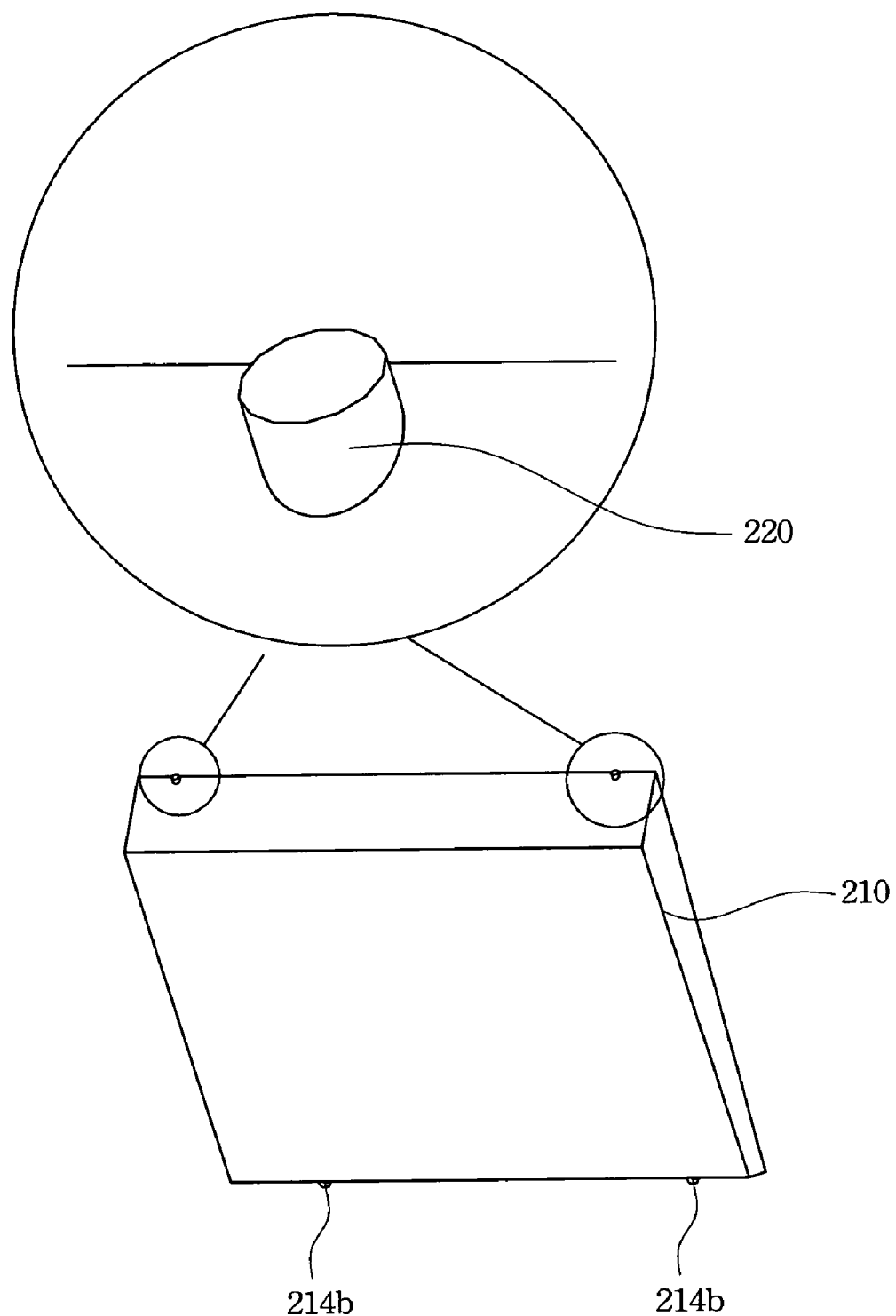
FIG. 4 is partially enlarged view of a portable computer according to an embodiment of the present invention.

Reference is made to FIG. 3 and FIG. 4. There is at least a third connection part 220 extending from the surface which corresponds to the position of the moveable base 210 and the slide button 216 in order to connect the slide button 216 of upper cover side wall 212b. The third connection part 220 can extend into and slide along the track 218 of the slide button 216, which may be a protruded bolt structure.

When the moveable base 210 and the slide button 216 of the upper cover 212 are combined as described in the foregoing description, the movement of the moveable base 210 can be controlled by sliding the slide button 216; that is, the slide button 216 can be used to open and close the extending space in the host case.

Figure 5A:
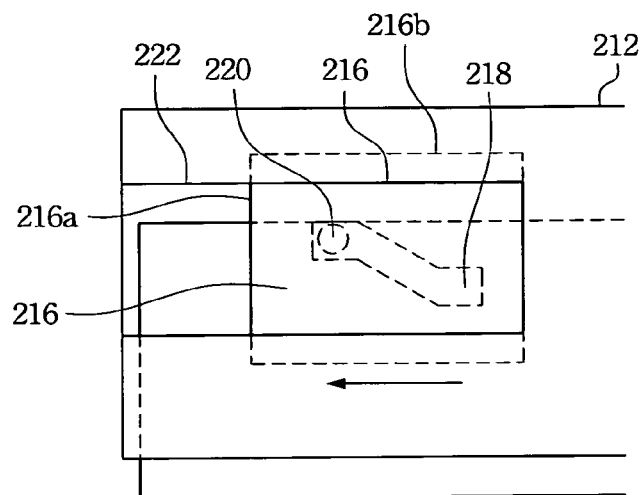
FIGS. 5A-5C illustrate the motion of a portable computer according to an embodiment of the present invention.
Figure 5B:
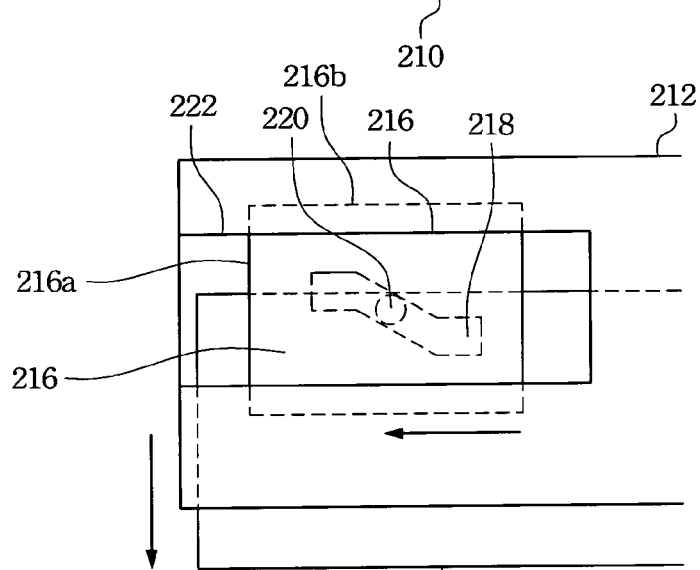
Figure 5C:
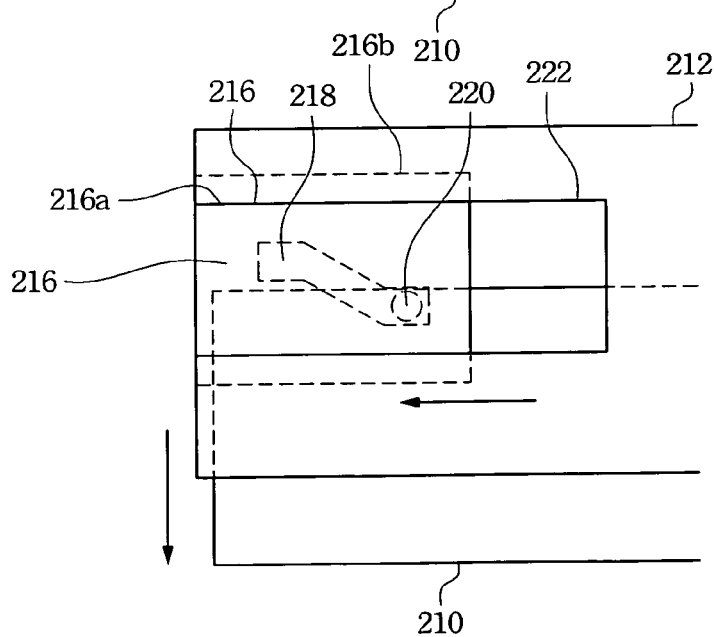

FIGS. 5A-5C respectively illustrate the relative position between the moveable base 210 and slide button 216 when the slide button 216 is sliding. In FIG. 5A, the slide button 216 is in an initial position and the third connection part 220 of the moveable base 210 is in the upper section of the reverse Z-shape track 218. The containing space of the host case is smallest at this point in time. In FIG. 5B, when the slide button 216 is gradually slid outward, the third connection part 220 is gradually shifted from the upper section to the middle section of the reverse Z-shape track 218, and the moveable base 210 is thus moved downward. The extending space in the host case is halfway open at this point in time. In FIG. 5C, the third connection part 220 is slid to the lower section of the reverse Z-shape track 218, and the moveable base 210 is moved to the lowest position. The containing space in the host case is completely opened at this time.

Similarly, if the extending space in the host case to be closed, the slide button 216 is slid in the reverse direction to pull the moveable base 210 back to the top position.

The sliding direction of the slide button 216 and the shape of the track 218 in the foregoing description are only examples and are not used to limit the present invention. If the movement of the moveable base 210 can be properly controlled, both the sliding direction of the slide button 216 and the shape of the track 218 may be any direction and shape, or the slide button structure may be replaced with any control structure which is able to control the movement of the moveable base 210. Furthermore, because the base of the host case structure according to the embodiment of the present invention is moveable, system circuitry of the electronic device comprising the moveable host case may be installed into the upper cover of the moveable host case.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
   an upper cover comprising a first connection part and an opening;
   a hinge;
   a moveable base comprising a second connection part and a third connection part, wherein the first connection part and the second connection part are connected by the hinge such that the moveable base can use the hinge as a center pivot relative to the upper cover; and
   a control structure adjacent to the opening, wherein the control structure is connected with the third connection part, such that when a force is applied to the control structure, the control structure slides in the opening causing the moveable base to also follows the slide of the control structure and pivot relative to the upper cover.

2. The electronic device as claimed in claim 1, wherein the first connection part is located on an upper cover side wall of the upper cover, the second connection part is located on a base side wall of the moveable base, and the hinge through the first connection part and the second connection part.

3. The electronic device as claimed in claim 1, wherein the hinge is a pivot axle.

4. The electronic device as claimed in claim 1, wherein the moveable base is a hollow shell body.

5. The electronic device as claimed in claim 1, wherein the control structure is a slide button, and a surface of the slide button has a track which connects with the third connection part, and when the slide button slides, the third connection part is slid along the track such that the moveable base also follows the slide of the third connection part and pivots relative to the upper cover.

6. The electronic device as claimed in claim 5, wherein the track is a reverse Z-shaped track.

7. The electronic device as claimed in claim 5, wherein the control structure comprises an operation part and a sliding part, the sliding part is in the upper cover and covers the opening, the operation part passes through the opening and slides along the edges of the opening, the operation part and the sliding part construct a T-shaped structure, and the track is in the sliding part.

8. The electronic device as claimed in claim 5, wherein the slide button and the opening are at the same side of the upper cover.

* * * * *